F. T. CABLE & T. S. BAILEY.
CLOSURE FOR JOINTS.
APPLICATION FILED MAR. 30, 1909.

954,668.

Patented Apr. 12, 1910.

WITNESSES:
L. H. Barlow
L. B. Penfield

INVENTORS,
Frank T. Cable
Theodore S. Bailey
BY
Pennie Goldsborough
ATTORNEYS

UNITED STATES PATENT OFFICE.

FRANK T. CABLE AND THEODORUS S. BAILEY, OF QUINCY, MASSACHUSETTS, ASSIGNORS TO ELECTRIC BOAT COMPANY, OF NEW YORK, N. Y., A CORPORATION OF NEW JERSEY.

CLOSURE FOR JOINTS.

954,668.  Specification of Letters Patent.  Patented Apr. 12, 1910.

Application filed March 30, 1909. Serial No. 486,750.

*To all whom it may concern:*

Be it known that we, FRANK T. CABLE and THEODORUS S. BAILEY, citizens of the United States, residing at Quincy, county of Norfolk, and State of Massachusetts, have invented certain new and useful Improvements in Closures for Joints; and we do hereby declare the following to be a full, clear, and exact description of the invention, such as will enable others skilled in the art to which it appertains to make and use the same.

The object of the invention is to provide a closure for joints, particularly where it is desired to make an air tight joint between two surfaces in a short space of time, and allowing a quick release of the two surfaces when desired, as for example in the case of torpedo tube breech doors, entrance scuttles, etc. in submarine boats.

The particular nature and mode of operation of the invention will be understood from the following description and the accompanying drawings.

Figure 1:
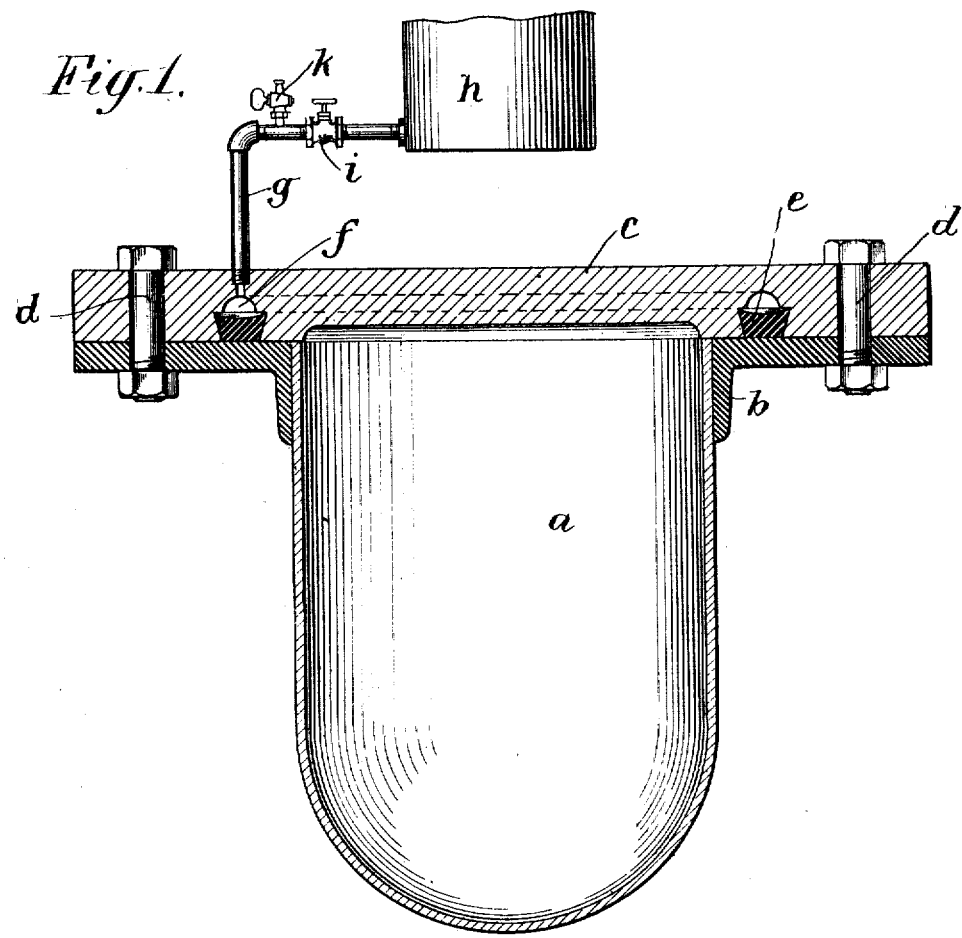
Figure 2:
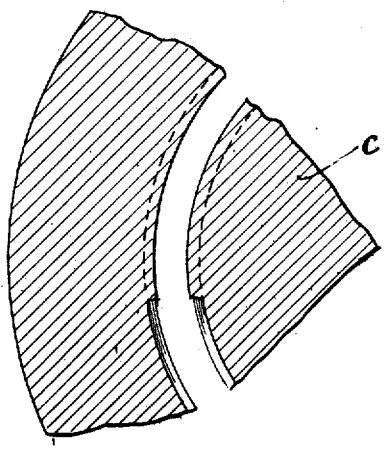

In the drawings Figure 1 is a central vertical section of a structure embodying our improved closure or gasket, and Fig. 2 is a fragmentary plan partly broken away of a portion of the structure in which the gasket is seated.

In the drawings $a$ represents a receptacle of any character which it is desired to surround with a closure effective to prevent the escape of gas under pressure. This receptacle is supported in a frame $b$ which is adapted to be quickly, and rather loosely, attached to a base $c$ by the bolts $d$. It would be impossible to secure the desired closure between two such parts by the use of the bolts alone, and to afford the desired closure we provide the structure shown comprising a gasket $e$ of rubber or the like, fitted within a dove-tail annular recess in the base $c$ and surrounding the edge of the receptacle $a$. A small space $f$, indicated as an annular recess semi-cylindrical in cross-section is left above the rubber, as shown in the drawings, and communicating with this recess is a pressure pipe $g$ extending from a pressure reservoir $h$ containing a fluid under pressure, said pressure pipe being controlled by cock $i$ and containing the relief cock $k$ for permitting the ready discharge of the pressure.

It will be understood that though we have in the drawings shown an annular recess of a dove-tail form, to contain the gasket $e$, the recess will in general be made to follow the outline of the opening, and may be of any form in cross-section adapted to retain the rubber ring, though the dove-tail form is one which is easily machined and is effective in practice.

From the foregoing description it will be understood that the structure employed is one in which the two separable parts may readily be attached to one another by the bolts $d$, and that when they have been so attached the closure may be attained by admitting pressure from the tank $h$ above the gasket $e$ to force the rubber against the face of the attached part $b$ and against the sides of the containing groove, thereby making a complete closure against the pressure contained in the receptacle $a$.

While we have shown bolts to illustrate a means of holding the two members together, it will be readily understood that any means for holding the surfaces together can be substituted, such as clamping devices, interrupted threads, or interrupted flange joints, which can be readily released by a single movement.

What we claim is:

The combination with two separable members attached together, of a closure for the joint between said members comprising a gasket seated in a groove in one of said members, a reservoir containing a fluid under pressure, and connections from the reservoir to a space in the groove behind the gasket, whereby the pressure may be applied behind the gasket to effect the closure.

In testimony whereof we affix our signatures, in presence of two witnesses.

FRANK T. CABLE.
THEODORUS S. BAILEY.

Witnesses:
W. D. FESLER,
F. L. BRAKE.